United States Patent
Ruslim et al.

(10) Patent No.: US 8,497,320 B2
(45) Date of Patent: Jul. 30, 2013

(54) POLYROTAXANE, CROSSLINKED STRUCTURE COMPRISING POLYROTAXANE AND POLYMER, AND PROCESSES FOR PRODUCING THESE

(75) Inventors: Christian Ruslim, Bunkyo-ku (JP); Mariko Suzuki, Bunkyo-ku (JP)

(73) Assignee: Advanced Softmaterials Inc., Kashiwa-shi (JP)

(*) Notice: Subject to any disclaimer, the term of this patent is extended or adjusted under 35 U.S.C. 154(b) by 702 days.

(21) Appl. No.: 12/674,047

(22) PCT Filed: May 7, 2009

(86) PCT No.: PCT/JP2009/058609
§ 371 (c)(1), (2), (4) Date: Feb. 18, 2010

(87) PCT Pub. No.: WO2009/136618
PCT Pub. Date: Nov. 12, 2009

(65) Prior Publication Data
US 2011/0105688 A1    May 5, 2011

(30) Foreign Application Priority Data
May 7, 2008  (JP) ................. 2008-121108

(51) Int. Cl.
C08B 37/16 (2006.01)
C08G 65/32 (2006.01)

(52) U.S. Cl.
USPC ...................... 525/54.26; 536/103

(58) Field of Classification Search
USPC ....................... 525/54.26; 536/103
See application file for complete search history.

(56) References Cited

U.S. PATENT DOCUMENTS 5,538,655 A     7/1996 Fauteux
2008/0097039 A1* 4/2008 Ito et al. ............... 525/384

FOREIGN PATENT DOCUMENTS

| WO | 2005/080469 A1 | 9/2005 |
| WO | 2005-095493 A1 | 10/2005 |
| WO | 2005/095493 A1 | 10/2005 |
| WO | 2005/108464 A1 | 11/2005 |
| WO | 2006/088200 A1 | 8/2006 |
| WO | 2008/015272 A1 | 2/2008 |

OTHER PUBLICATIONS

Araki, J., et al., "Preparation of a 'Sliding Graft Copolymer', an Organic Solvent-Soluble Polyrotaxane Containing Mobile Side Chains, and Its Application for a Crosslinked Elastomeric Supramolecular Film," Soft Matter 4(2):245-249, Feb. 1, 2008.
Extended European Search Report mailed Jul. 30, 2012, issued in corresponding Application No. EP 09742742.1, filed May 7, 2009, 6 pages.
International Search Report, mailed Jun. 23, 2009, issued in corresponding International Application No. PCT/JP2009/058609, filed May 7, 2009.

* cited by examiner

Primary Examiner — Ling Choi
Assistant Examiner — Chun-Cheng Wang
(74) Attorney, Agent, or Firm — Christensen O'Connor Johnson Kindness PLLC (57) ABSTRACT

A process is provided by which a polyrotaxane including cyclic molecules having a relatively long graft chain is easily obtained. Also provided is a polyrotaxane which includes cyclic molecules having a radical polymerization initiation site and is for use as a raw material in the process. The polyrotaxane comprises: a pseudo-polyrotaxane comprising cyclic molecules clathrated with a linear molecule, the cavities of the cyclic molecules having been pierced by the linear molecule; and blocking groups disposed respectively at both ends of the pseudo-polyrotaxane so as not to release the cyclic molecules. The cyclic molecules in the polyrotaxane have a radical polymerization initiation site.

24 Claims, 1 Drawing Sheet

POLYROTAXANE, CROSSLINKED STRUCTURE COMPRISING POLYROTAXANE AND POLYMER, AND PROCESSES FOR PRODUCING THESE

TECHNICAL FIELD

The present invention relates to a polyrotaxane having a cyclic molecule(s) having a radical polymerization initiation site, a polyrotaxane having a cyclic molecule(s) having a graft chain obtained by using the polyrotaxane, a material having a crosslinked body between the polyrotaxane and a polymer, a material having the polyrotaxane and/or the material, and methods for producing the polyrotaxane, the crosslinked body and the material.

BACKGROUND ART

Various methods have been used to improve physical properties of a polyrotaxane. For example, patent document 1 discloses a method by which physical properties of a polyrotaxane are improved by a method where a hydroxyl group of α-cyclodextrin that is a cyclic molecule is substituted with another functional group. Patent document 1 discloses that substitution of a hydroxyl group(s) of α-cyclodextrin with a hydroxy propyl group(s) or methyl group(s) with a high substitution rate can result in a water-soluble polyrotaxane. However, patent document 1 neither discloses nor suggests bonding a group having a long graft chain to a cyclic molecule.

Further, patent document 2 discloses a crosslinked polyrotaxane in which cyclic molecules (α-cyclodextrins) of a polyrotaxane are crosslinked with each other by using polyethylene glycol. It is further disclosed that, in order to obtain the crosslinked polyrotaxane, polyrotaxane molecules themselves are activated in advance with carbodiimidazole and thereafter a terminal reactive oligomer is added to react with. However, there was a problem that polyrotaxane molecules may be crosslinked with each other when polyrotaxane is activated with carbodiimidazole. Alternatively, there was a problem that a competitive reaction is generated between a residual hydroxyl group of α-cyclodextrin and a terminal hydroxyl group of polyethylene glycol.

More, patent document 3, as described in the patent document 1, discloses a method by which physical properties of polyrotaxane are improved by substituting a hydroxyl group of α-cyclodextrin as a cyclic molecule, with another functional group. Specifically, patent document 3 discloses that when a hydroxyl group of α-cyclodextrin is substituted with a hydrophobic group (ε-caprolactone), the polyrotaxane can result in improved solubility in toluene and ethyl acetate. However, since the substitution reaction of the hydroxyl group(s) with a hydrophobic group(s) (ε-caprolactone) made use of an esterification reaction owing to a ring-opening reaction of lactone, there were problems that reaction conditions, for example, water-inhibiting and high-temperature conditions have to be used and a substituent can not be readily obtained.

Patent Document 1: WO 2005/080469.
Patent Document 2: WO 2002/002159.
Patent Document 3: WO 2007/026578.

DISCLOSURE OF THE INVENTION

Problems to be Solved by the Invention

An object of the present invention is to provide a method for readily obtaining a polyrotaxane having a cyclic molecule having a relatively long graft chain, and a polyrotaxane that is a raw material used for the method.

Further, other than or in addition to the above object, an object of the present invention is to provide a polyrotaxane having a cyclic molecule having a graft chain obtained by using a polyrotaxane that is the raw material.

More, other than or in addition to the above objects, an object of the present invention is to provide a material having the above-obtained "polyrotaxane that is a raw material" and/ or "polyrotaxane having a cyclic molecule having a graft chain", a crosslinked body therewith and a material having the crosslinked body.

Further, other than or in addition to the above objects, an object of the present invention is to provide a method for producing "a polyrotaxane that becomes a raw material", a method for producing "a polyrotaxane having a cyclic molecule having a graft chain", a method for producing a material having the polyrotaxane, a method for producing a crosslinked body therewith, and a method for producing a material having the crosslinked body.

Means for Solving Problems

The present inventors have found following inventions:

<1> A polyrotaxane comprising a pseudopolyrotaxane, which has a linear molecule and a cyclic molecule(s) in which the linear molecule is included in a cavity (cavities) of the cyclic molecule(s) in a skewered manner, and capping groups, each of which locates at each end of the pseudopolyrotaxane in order to prevent the dissociation of the cyclic molecule(s), wherein the cyclic molecule comprises a radical polymerization initiation site.

<2> In the above item <1>, the radical polymerization initiation site may be a living radical polymerization initiation site.

<3> In the above item <1> or <2>, the radical polymerization initiation site may be an atom transfer radical polymerization initiation site.

<4> In any one of the above items <1> to <3>, the cyclic molecule may have hydroxy groups, and a part or all of the hydroxy groups may be substituted with an organic halogen compound residue(s), to form the radical polymerization initiation site.

<5> In the above item <4>, the organic halogen compound residue(s) may be a residue derived from an organic halogen compound selected from the group consisting of 2-bromoisobutylyl bromide, 2-bromobutyric acid, 2-bromopropionic acid, 2-chloropropionic acid, 2-bromoisobutyric acid, epichlorohydrin, epibromohydrin, and 2-chloroethyl isocyanate.

<6> In any one of the above items <1> to <5>, the polyrotaxane may have a graft chain, which is bound to the polyrotaxane via the radical polymerization initiation site.

<7> In the above item <6>, the graft chain may be formed by a radical polymerization of a monomer, may be a macromonomer, or may be formed by a radical polymerization of a macromonomer. Preferably, the graft chain may be formed by the radical polymerization, preferably a living radical polymerization, more preferably an atom transfer radical polymerization of the monomer and/or the macromonomer.

<8> In the above item <6> or <7>, the graft chain may have a molecular weight of 100 to 20,000, preferably 200 to 10,000, more preferably 300 to 5,000.

<9> In any one of the above items <6> to <8>, the graft chain may be either a homopolymer made of one monomer or a copolymer made of two or more monomers, the copolymer being one selected from the group consisting of a random copolymer, a block copolymer, an alternate copolymer and a graft copolymer.

<10> In any one of the above items <7> to <9>, the monomer or macromonomer may be an ethylenically unsaturated monomer.

<11> In the above item <10>, the ethylenically unsaturated monomer may be a monomer having at least one functional group selected from the group consisting of an acrylic group, a methacrylic group, a vinyl group, and a styryl group.

<12> In any one of the above items <6> to <11>, the radical polymerization initiation site may be an atom transfer radical polymerization initiation site, the cyclic molecule may have hydroxyl groups, a part or all of the hydroxyl groups may be substituted with an organic halogen compound residue(s) to form the atom transfer radical polymerization initiation site, the monomer or macromonomer may be an ethylenically unsaturated monomer, and the graft chain may be formed by the atom transfer radical polymerization of the ethylenically unsaturated monomer.

<13> In any one of the above items <1> to <12>, the cyclic molecule may be selected from the group consisting of α-cyclodextrin, β-cyclodextrin and γ-cyclodextrin.

<14> In any one of the above items <1> to <13>, the linear molecule may be selected from the group consisting of polyvinyl alcohol, polyvinylpyrrolidone, poly(meth)acrylic acid, cellulose-based resins (carboxymethylcellulose, hydroxyethylcellulose, hydroxypropylcellulose and the like), polyacrylamide, polyethylene oxide, polyethylene glycol, polypropylene glycol, polyvinyl acetal-based resins, polyvinyl methyl ether, polyamine, polyethyleneimine, casein, gelatin, starch and the like and/or copolymers thereof, polyolefin-based resins such as polyethylene, polypropylene, and copolymer resins with other olefinic monomers, polyester resins, polyvinyl chloride resins, polystyrene-based resins such as polystyrene, acrylonitrile-styrene copolymer resin and the like, acrylic resins such as polymethyl methacrylate, copolymer of (meth)acrylate, acrylonitrile-methyl acrylate copolymer resin and the like, polycarbonate resins, polyurethane resins, vinyl chloride-vinyl acetate copolymer resin, polyvinylbutyral resin and the like; and derivatives and modifications thereof, polyisobutylene, polytetrahydrofuran, polyaniline, acrylonitrile-butadiene-styrene copolymer (ABS resin), polyamides such as nylon and the like, polyimides, polydienes such as polyisoprene, polybutadiene and the like, polysiloxanes such as polydimethylsiloxane and the like, polysulfones, polyimines, polyacetic anhydrides, polyureas, polysulfides, polyphosphazenes, polyketones, polyphenylenes, polyhaloolefins, and derivatives thereof. For example, the linear molecule may be selected from the group consisting of polyethylene glycol, polyisoprene, polyisobutylene, polybutadiene, polypropylene glycol, polytetrahydrofuran, polydimethylsiloxane, polyethylene, polypropylene, polyvinyl alcohol and polyvinyl methyl ether. And more specifically, the linear molecule may be selected from the group consisting of polyethylene glycol, polypropylene glycol, polytetrahydrofuran, polydimethylsiloxane, polyethylene and polypropylene, and preferably polyethylene glycol.

<15> In anyone of the above items <1> to <14>, the linear molecule may have a molecular weight of 3,000 or more.

<16> In any one of the above items <1> to <15>, the capping group may be selected from the group consisting of dinitrophenyl groups; cyclodextrins; adamantane groups; trityl groups; fluoresceins; pyrenes; substituted benzenes (examples of the substituent may include, but are not limited to, alkyl, alkyloxy, hydroxy, halogen, cyano, sulfonyl, carboxyl, amino, phenyl and the like. The substituent may be single or plural); polycyclic aromatics which may be substituted (examples of the substituent may include, but are not limited to, those described above. The substituent may be single or plural); and steroids. Preferably, the capping group may be selected from the group consisting of dinitrophenyl groups; cyclodextrins; adamantane groups; trityl groups; fluoresceins; and pyrenes, more preferably adamantane groups; or trityl groups.

<17> In any one of the above items <1> to <16>, the cyclic molecule may be derived from α-cyclodextrin, and the linear molecule may be polyethylene glycol.

<18> In any one of the above items <1> to <17>, the linear molecule may have the cyclic molecule included in a skewered manner at an amount of 0.001 to 0.6, preferably 0.01 to 0.5, more preferably 0.05 to 0.4 of a maximum inclusion amount, which is defined as an amount at which the cyclic molecules can be included at maximum when the linear molecule has the cyclic molecules included in a skewered manner, and the amount at maximum is normalized to be 1.

<19> A material comprising:
a) the polyrotaxane described in any one of above items <1> to <18>; and
b) a polymer;
wherein a) the polyrotaxane and b) the polymer are bound to each other through a covalent bond. In one embodiment, <19A> the material may consist essentially of the above a) and b). Further, <19B> the material may comprise the above a) and b), and the material may be free from any solvent. <19C> In any one of the above items <19> to <19C>, the material further may have viscoelasticity.

<20> In the above item <19>, a) the polyrotaxane may be a-1) any one described in the above items <1> to <5> and <13> to <18>.

<21> In the above item <19>, a) the polyrotaxane may be a-2) any one described in the above items <6> to <18>.

<22> In any one of above items <19> to <21>, b) the polymer may be c) a polyrotaxane comprising a pseudopolyrotaxane, which has a linear molecule and a cyclic molecule (s) in which the linear molecule is included in a cavity (cavities) of the cyclic molecule (s) in a skewered manner, and capping groups, each of which locates at each end of the pseudopolyrotaxane in order to prevent the dissociation of the cyclic molecule(s).

<23> In any one of the above items <19> to <21>, b) the polymer may be d) the polyrotaxane described in any one of the above items <1> to <5> and <13> to <18>.

<24> In any one of the above items <19> to <21>, b) the polymer may be e) the polyrotaxane described in any one of the above items <6> to <18>.

<25> A material comprising:
d) the polyrotaxane described in any one of the above items <1> to <5> and <13> to <18>; and/or
e) the polyrotaxane described in any one of the above items <6> to <18>; and/or
f) the material described in any one of the above items <19> to <24>.

<26> A material comprising:
e) the polyrotaxane described in any one of the above items <6> to <18>; and/or
f) the material described in any one of the above items <19> to <24>.

<27> A method for producing a polyrotaxane having a cyclic molecule comprising a radical polymerization initiation site: comprising the steps of:
A) preparing a polyrotaxane comprising a pseudopolyrotaxane, which has a linear molecule and a cyclic molecule(s) in which the linear molecule is included in a cavity (cavities)

of the cyclic molecule(s) in a skewered manner, and capping groups, each of which locates at each end of the pseudopolyrotaxane in order to prevent the dissociation of the cyclic molecule(s); and B) introducing the radical polymerization initiation site into the cyclic molecule.

<28> In the above item <27>, the method may further comprise a step of C) introducing a functional group other than the radical polymerization initiation site into said cyclic molecule, after the step A), before the step B), or substantially during the step B).

<29> A method for producing a polyrotaxane having a cyclic molecule comprising a graft chain: comprising the steps of:

A) preparing a polyrotaxane comprising a pseudopolyrotaxane, which has a linear molecule and a cyclic molecule(s) in which the linear molecule is included in a cavity (cavities) of the cyclic molecule(s) in a skewered manner, and capping groups, each of which locates at each end of the pseudopolyrotaxane in order to prevent the dissociation of the cyclic molecule(s);

B) introducing the radical polymerization initiation site into the cyclic molecule; and D) radical graft polymerizing a monomer and/or a macromonomer in the presence of a catalyst, to form the graft chain such that the cyclic molecule comprises the graft chain obtained by the polymerization.

<30> In the above item <29>, the catalyst may be a metal complex having at least one central metal selected from the group consisting of copper, nickel, ruthenium and iron.

<31> In the above item <29> or <30>, the radical polymerization initiation site may be an atom transfer radical polymerization initiation site, the cyclic molecule may have hydroxyl groups, a part or all of the hydroxyl groups may be substituted with an organic halogen compound residue(s) to form the atom transfer radical polymerization initiation site, the monomer and/or macromonomer may be an ethylenically unsaturated monomer, the catalyst may be a metal complex having at least one central metal selected from the group consisting of copper, nickel, ruthenium and iron, and the graft chain may be formed by an atom transfer radical polymerization of the ethylenically unsaturated monomer.

<32> A method for producing a material comprising a) the polyrotaxane described in any one of above items <1> to <18>; and b) a polymer, wherein a) the polyrotaxane and b) the polymer are bound to each other through a covalent bond, comprising the steps of:

X) preparing a) the polyrotaxane described in any one of above items <1> to <18>;

Y) preparing b) the polymer; and

Z) bonding a) the polyrotaxane and b) the polymer through a covalent bond.

<33> In the above item <32>, in the step Z), a) the polyrotaxane and b) the polymer may be bound to each other by use of i) a crosslinking agent.

<34> In the above item <32> or <33>, in the step Z), a) the polyrotaxane and b) the polymer may be bound to each other by use of ii) a catalyst.

<35> In any one of the above items <32> to <34>, in the step Z), a) the polyrotaxane and b) the polymer may be bound to each other by photo-irradiation.

DESCRIPTION OF THE DRAWINGS

Figure 1:
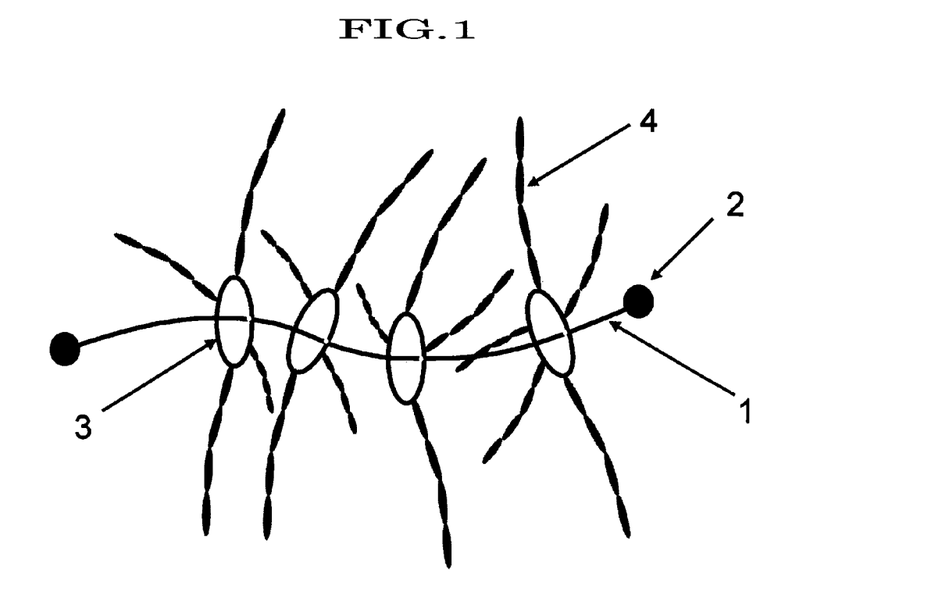
FIG. 1 is a schematic diagram illustrating "a polyrotaxane having a cyclic molecule having a graft chain" according to the present invention.
Figure 2:
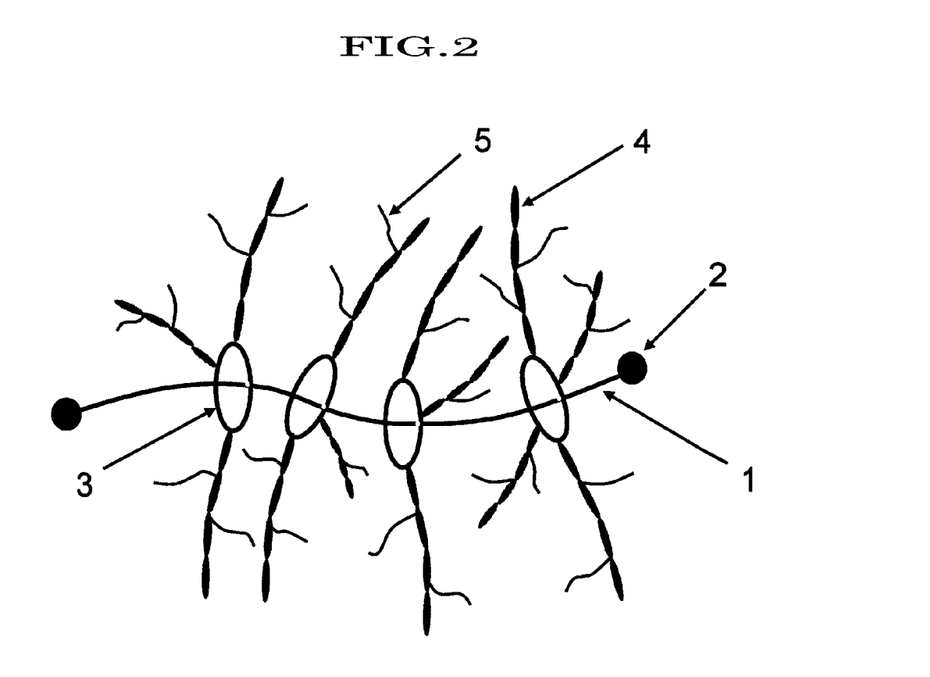
FIG. 2 is a schematic diagram illustrating "a polyrotaxane having a cyclic molecule having a graft chain" according to the present invention, wherein a polyrotaxane "has a polymer that grafted to the graft chain".

FIG. 1 is a diagrammatical illustration of a polyrotaxane having cyclic molecules with graft chains; and FIG. 2 is a diagrammatical illustration of a polyrotaxane having cyclic molecules with graft chains and polymers grafted to the graft chains.

Effects of the Invention

The present invention can provide a method for readily obtaining a polyrotaxane having a cyclic molecule having a relatively long graft chain, and a polyrotaxane that is a raw material used for the method.

Further, other than or in addition to the above-mentioned effect, the present invention can provide a polyrotaxane having a cyclic molecule having a graft chain obtained by using a polyrotaxane that is a raw material.

More, other than or in addition to the above-mentioned effects, the present invention can provide a material having the above-obtained "polyrotaxane that is a raw material" and/or "polyrotaxane having a cyclic molecule having a graft chain", a crosslinked body therewith and a material having the crosslinked body.

Further, other than or in addition to the above-mentioned effects, the present invention can provide a method for producing the "polyrotaxane that is a raw material", a method for producing the "polyrotaxane having a cyclic molecule having a graft chain", a method for producing a material having the polyrotaxane, a method for producing a crosslinked body therewith, and a method for producing a material having the crosslinked body.

BEST MODE FOR CARRYING OUT THE INVENTION

The present invention will be described in detail hereinafter.

The present invention provides a polyrotaxane characterized in that a cyclic molecule of the polyrotaxane comprises a radical polymerization initiation site.

More, the present invention provides a polyrotaxane having a cyclic molecule having a graft chain via a radical polymerization initiation site or a part thereof by using the polyrotaxane characterized in that the cyclic molecule of the polyrotaxane comprises the radical polymerization initiation site.

Further, the present invention provides i) a material having a crosslinked body between the "polyrotaxane having a cyclic molecule having a radical polymerization initiation site" and a polymer, ii) a material having a crosslinked body between the "polyrotaxane having a cyclic molecule having a graft chain" and a polymer, or a material having a mixture of the i) crosslinked body and the ii) crosslinked body.

More, the present invention provides a method for producing the "polyrotaxane having a cyclic molecule having a radical polymerization initiation site"; a method for producing the "polyrotaxane having a cyclic molecule having a graft chain"; and a method for producing the material having a crosslinked body.

Hereinafter, each of the present inventions will be detailed.
<Polyrotaxane Having a Cyclic Molecule of the Polyrotaxane Comprising a Radical Polymerization Initiation Site>

The present invention provides a polyrotaxane comprising a pseudopolyrotaxane, which has a linear molecule and a cyclic molecule(s) in which the linear molecule is included in a cavity (cavities) of the cyclic molecule s) in a skewered manner, and capping groups, each of which locates at each end of the pseudopolyrotaxane in order to prevent the dissociation of the cyclic molecule(s), in which the cyclic molecule comprises a radical polymerization initiation site.

The term "a pseudopolyrotaxane" used herein means a compound, which has a linear molecule and a cyclic molecule(s) in which the linear molecule is included in a cavity (cavities) of the cyclic molecule(s) in a skewered manner.

Further, the term "a polyrotaxane" used herein means a compound, in which a capping group locates at each end of the "pseudopolyrotaxane", in other words, at each end of the linear molecule in the "pseudopolyrotaxane", in order to prevent the dissociation of the cyclic molecule(s). In other words, a "pseudopolyrotaxane" means a "polyrotaxane" with a capping group located at each end thereof.

<<Radical Polymerization Initiation Site>>

A polyrotaxane according to the present invention comprises a cyclic molecule thereof having a radical polymerization initiation site. The term "radical polymerization initiation site" used herein literally means a site capable of initiating a "radical polymerization". Further, the term "radical polymerization initiating point" used herein means a place contained in the "radical polymerization initiation site" before the "radical polymerization" initiates. In actuality, when the "radical polymerization" is performed, the "radical polymerization initiating point" means a point where monomers are bound owing to the "radical polymerization". For example, when a group derived from 2-bromoisobutylyl bromide, that is, 2-bromoisobutylyl group is used as the radical polymerization initiation site, the 2-bromoisobutylyl group is a "radical polymerization initiation site" and a radical generated owing to a movement of a bromine atom is the "radical polymerization initiation point".

The term "monomer" used herein means a polymerizable monomer. A macromonomer containing, for example, an oligomerized monomer or a polymerized monomer as well is included in the term "monomer" used herein.

A radical polymerization initiation site may be preferably a living radical polymerization initiation site and more preferably an atom transfer radical polymerization initiation site.

Furthermore, a radical polymerization can be advantageously applied to polymerize monomers that are commercially important in a wide range and many of which can not be polymerized by other polymerization method. A random copolymer can be produced by a radical polymerization more readily than other polymerization methods (for example, ionization polymerization). Further, a monomer having a polar group such as a hydroxyl group is difficult to use in the ionization polymerization. More, a radical polymerization method can be performed in a bulk, a solution, a suspension or an emulsion. Among them, since an atom transfer radical polymerization is one of the living radical polymerization, there is no side reaction caused in a general radical polymerization and a growth reaction is homogeneous. Accordingly, a polymer having a uniform molecular weight and a controlled block polymer can be obtained. Examples of documents for the atom transfer radical polymerization method include Japanese Patent Application Publication (JP-A) No. 10-509475; Matyjaszewski et. al., J. Am. Chem. Soc., 1995, 117, 5614; Science, 1996, 272, 866; Sawamoto et. al., Macromolecules. 1995, 28, 1721; and WO1996-30421 (whole contents thereof are incorporated herein by reference).

Further, a radical polymerization initiation site may be specifically as follows:

A cyclic molecule may have hydroxyl groups, and a part or all of the hydroxyl groups are substituted with an organic halogen compound residue(s), to form a radical polymerization initiation site(s). The organic halogen compound residue is not particularly restricted as long as it is a residue of the "organic halogen compound" with which a part or all of the hydroxyl groups of the cyclic molecule are substituted. Examples of the "organic halogen compound" may include, but are not limited to, 2-bromoisobutylyl bromide, 2-bromobutyric acid, 2-bromopropionic acid, 2-chloropropionic acid, 2-bromoisobutyric acid, epichlorohydrin, epibromohydrin, 2-chloroethyl isocyanate and the like. The "organic halogen compound residue" may be a residue derived from the "organic halogen compound".

In a case where a part or all of the hydroxyl groups of the cyclic molecule are substituted, an organic halogen compound residue may bond either via a covalent bond by reacting with the hydroxyl group or by reacting with a functional group obtained by converting the hydroxyl group into another functional group such as amine, carboxylic acid, isocyanate, imidazole or acid anhydride. A cyclic molecule will be described in detail hereinafter.

Hereinafter, elements constituting the polyrotaxane will be described respectively.

<<Cyclic Molecule>>

The cyclic molecule of the polyrotaxane according to the present invention is not particularly restricted as long as a linear molecule is included in cavities of the cyclic molecules in a skewered manner.

The cyclic molecule may be one having hydroxy groups, for example, may be selected from the group consisting of α-cyclodextrin, β-cyclodextrin and γ-cyclodextrin. In a case where the cyclic molecule has hydroxy groups, a part of the hydroxy groups may be substituted with other group(s). Furthermore, examples of the other group(s) may include, but are not limited to, a hydrophlicating group having an ability to hydrophlicate the polyrotaxane according to the present invention, a hydrophobicating group having an ability to hydrophobicate the polyrotaxane according to the present invention, a photoreactive group and the like.

<<Linear Molecule>>

The linear molecule of a polyrotaxane according to the present invention is not limited as long as the linear molecule may be included in a cavity (cavities) of the cyclic molecule(s) in a skewered manner.

For example, the linear molecule of polyrotaxane in a material according to the present invention may include polyvinyl alcohol, polyvinylpyrrolidone, poly(meth)acrylic acid, cellulose-based resins (carboxymethylcellulose, hydroxyethylcellulose, hydroxypropylcellulose and the like), polyacrylamide, polyethylene oxide, polyethylene glycol, polypropylene glycol, polyvinyl acetal-based resins, polyvinyl methyl ether, polyamine, polyethyleneimine, casein, gelatin, starch and the like and/or copolymers thereof, polyolefin-based resins such as polyethylene, polypropylene, and copolymer resins with other olefinic monomers, polyester resins, polyvinyl chloride resins, polystyrene-based resins such as polystyrene, acrylonitrile-styrene copolymer resin and the like, acrylic resins such as polymethyl methacrylate, copolymer of (meth) acrylate, acrylonitrile-methyl acrylate copolymer resin and the like, polycarbonate resins, polyurethane resins, vinyl chloride-vinyl acetate copolymer resin, polyvinylbutyral resin and the like; and derivatives and modifications thereof, polyisobutylene, polytetrahydrofuran, polyaniline, acrylonitrile-butadiene-styrene copolymer (ABS resin), polyamides such as nylon and the like, polyimides, polydienes such as polyisoprene, polybutadiene and the like, polysiloxanes such as polydimethylsiloxane and the like, polysulfones, polyimines, polyacetic anhydrides, polyureas, polysulfides, polyphosphazenes, polyketones, polyphenylenes, polyhaloolefins, and derivatives thereof. For example, the linear molecule may be selected from the group consisting of polyethylene glycol, polyisoprene, polyisobutylene, polybutadiene, polypropylene glycol, polytetrahydrofuran, polydimethylsiloxane, polyethylene, polypropylene, polyvinyl alcohol and polyvinyl methyl ether. More specifically, the linear molecule may be selected from the group consisting of polyethylene glycol, polypropylene glycol, polytetrahydrofuran, polydimethylsiloxane, polyethylene and polypropylene, and preferably polyethylene glycol.

A molecular weight of the linear molecule may be 3,000 or more.

In the polyrotaxane according to the present invention, the cyclic molecule may be derived from α-cyclodextrin, and the linear molecule may be polyethylene glycol.

The linear molecule may have the cyclic molecules included in a skewered manner at an amount of 0.001 to 0.6, preferably 0.01 to 0.5, and more preferably 0.05 to 0.4 of a maximum inclusion amount, which is defined as an amount at which the cyclic molecules can be included at maximum when the linear molecule has the cyclic molecules included in a skewered manner, and the amount at maximum is normalized to be 1.

The maximum inclusion amount of a cyclic molecule can be determined depending on the length of a linear molecule and the thickness of a cyclic molecule. For example, when the linear molecule is polyethylene glycol and the cyclic molecule is α-cyclodextrin molecule, the maximum inclusion amount is measured experimentally (see, Macromolecules 1993, 26, 5698-5703, whole contents of which are incorporated herein by reference).

<<Capping Group>>

The capping group of the polyrotaxane according to the present invention is not limited, as long as the group is located at both ends of a pseudopolyrotaxane, and the group has an action of preventing dissociation of a cyclic molecule(s) from a linear molecule.

For example, the capping group may be selected from the group consisting of dinitrophenyl groups; cyclodextrins; adamantane groups; trityl groups; fluoresceins; pyrenes; substituted benzenes (example of the substituent may include, but are not limited to, alkyl, alkyloxy, hydroxy, halogen, cyano, sulfonyl, carboxyl, amino, phenyl and the like. The substituent may be single or plural); polycyclic aromatics which may be substituted (examples of the substituent may include, but are not limited to, those described above. The substituent may be single or plural); and steroids. Preferably, the capping group may be selected from the group consisting of dinitrophenyl groups; cyclodextrins; adamantane groups; trityl groups; fluoresceins; and pyrenes, more preferably adamantane groups; or trityl groups.

<Polyrotaxane Having a Cyclic Molecule Having a Graft Chain>

The present invention provides a polyrotaxane having a cyclic molecule having a graft chain.

In particular, the present invention provides a polyrotaxane having a cyclic molecule having a graft chain via a radical polymerization site or a part thereof by using the polyrotaxane having the cyclic molecule having the radical polymerization initiation site. Elements constituting the polyrotaxane are the same as mentioned above.

In order to intuitively understand the "polyrotaxane having a cyclic molecule having a graft chain" according to the present invention, it will be described with reference to a drawing. FIG. 1 is a schematic diagram illustrating "a polyrotaxane having a cyclic molecule having a graft chain" according to the present invention. In FIG. 1, reference numerals 1, 2, 3 and 4, respectively show a linear molecule, a capping group, a cyclic molecule and a graft chain. A polyrotaxane is formed in such a manner that a linear molecule 1 is included in a skewered manner in cavities of cyclic molecules 3 to form a pseudopolyrotaxane, and, at each end of the pseudopolyrotaxane, a capping group 2 is located so that the cyclic molecule 3 may not dissociate from an included state. In FIG. 1, each of the cyclic molecules 3 comprises a plurality of graft chains 4.

The term "graft chain" used herein means a chain bonded to a cyclic molecule, with a polyrotaxane as a main chain. The graft chain can result in readily improved chemical and physical properties of the polyrotaxane (for example, solubility to a solvent, improvement in compatibility with other polymer, control of a glass transition temperature, heat resistance, impact resistance, workability and the like). In addition thereto, the polyrotaxane can have advantages of general graft polymers such as control of microphase separation in a polymer, control of micelle formation in a solution, compatibilization of a polymer alloy, or the like. Further, since the cyclic molecule(s) is/are movable (slidable) relatively on a linear molecule, that is one of the characteristics of a polyrotaxane, a graft chain as well is movable (slidable) together with the cyclic molecule, thereby to provide effects caused by the operations. For example, when various incompatible polymers are incorporated in a graft chain, a material, that has excellent viscoelasticity, together with a controlled microphase separated structure, can be designed. More, when an intramolecular interaction of a cyclic molecule, for example, a cyclodextrin is utilized, a material, that shows reversible microphase separation by external stimulation, can be designed as well. That is, not only various existing materials are improved but also polyrotaxane can be provided with a higher value.

A graft chain can have various functional groups (examples thereof may include, but are not limited to, a hydroxyl group, an amino group, a sulfonate group, a carboxyl group, an alkoxysilane group, an isocyanate group, a thioisocyanate group, an ammonium salt group, a photoreactive group and the like) depending on characteristics desired to impart to polyrotaxane; and/or monomers used.

The graft chain may have a molecular weight of 100 to 20,000, preferably 200 to 10,000 and more preferably 300 to 5,000.

A molecular weight of a graft chain, which depends on a cyclic molecule of a polyrotaxane having the graft chain, a linear molecule, a capping group, an inclusion amount of cyclic molecules, a radical polymerization initiation site and the number of bonds thereof, and a monomer forming a graft chain can be measured from GPC measurements, NMR measurements or IR measurements. For example, when a molecular weight of a polyrotaxane before graft chain formation is known, a molecular weight of a graft chain can be measured from a difference between an average molecular weight that is a GPC measurement of "a resulting polyrotaxane having a graft chain" and "a molecular weight of a polyrotaxane before graft chain formation".

A graft chain may consist of a macromonomer, or may be formed of a homopolymer made of only one monomer (macromonomer as well is included as a monomer), or may be formed of a copolymer made of two or more monomers (macromonomer as well is included as a monomer). In a case of using the copolymer, the copolymer may be a random copolymer, a block copolymer, a graft copolymer, an alternate copolymer or a copolymer of other forms. In a case of the graft copolymer, a chain that grafts to a main chain (the "graft chain") of the graft copolymer may be a polymer chain derived from a monomer (including a macromonomer as a monomer) the same as a main chain (the "graft chain") or a polymer chain derived from a different monomer. The graft chain of the graft copolymer may be a homopolymer or a copolymer made of two or more monomers. A monomer (including a macromonomer) that forms a graft chain will be described later.

A polyrotaxane having a polymer grafted to a graft chain will be described with reference to FIG. 2. FIG. 2 is a schematic diagram illustrating "a polyrotaxane having a cyclic molecule having a graft chain" according to the present invention, "having a polymer grafted to the graft chain". In FIG. 2, reference numerals 1, 2, 3, 4 and 5, respectively show a linear molecule, a capping group, a cyclic molecule, a graft chain and a polymer grafted to the graft chain. In FIG. 2, "a polyrotaxane having a cyclic molecule having a graft chain" is formed in a manner similar to that of FIG. 1. Further, the cyclic molecules 3 each have a plurality of graft chains 4 and each of the graft chains further comprises a polymer 5 grafted to the graft chain 4.

The "polymer grafted to the graft chain" can be obtained by, for example, one of methods mentioned below: 1) A monomer having an active group (for example, a hydroxyl group, an amino group, carboxylic group and the like) is introduced in the graft chain. By utilizing the active group, another polymer, that is, a "polymer grafted to the graft chain" is formed. As the active group here, the same as the formation of a "graft chain", a "radical polymerization initiation site", preferably a "living radical polymerization initiation site" and more preferably an "atom transfer radical polymerization initiation site" as well can be used. When such a method is used, as is mentioned above, as a polymer grafted to the graft chain, various polymers can be used. For example, also monomers or polymers difficult to introduce as the graft chain can be used. More specifically, monomers or polymers thereof difficult to introduce as the graft chain such as ε-caprolactone or poly(ε-caprolactone) that is a ring-opening polymer thereof can be introduced as a polymer grafted to the graft chain.

Alternatively, 2) upon forming a "graft chain", the use of either a macromonomer having a branched chain or either one of a macromonomer or a low molecular weight monomer can provide a branched chain of a macromonomer as the "polymer grafted to the graft chain".

One end of the graft chain bonds to the cyclic molecule. On the other hand, another end thereof may be free or bonds to another compound. For example, in a case where a residue derived from 2-bromoisobutylyl bromide of which radical polymerization initiation site is an atom transfer radical polymerization initiation site, that is, 2-bromoisobutylyl group is used, another end of the graft chain after grafting is "—Br", that is, free. The "—Br" may react with another compound, to form another functional group. Another functional group(s) will be described later. Further, the "—Br" and/or another functional group may react with other polymer, to form a crosslinked body. Thus, the formation of another end of the graft chain into a crosslinked body with other functional group, a substance bonded with other compound or a crosslinked body with other polymer can variously modify the characteristics of the polyrotaxane by using another functional group, another compound, other polymer, and the like.

When an organic halogen compound residue that is an atom transfer radical polymerization initiation site is used as a radical polymerization initiation site, as is mentioned above, another end after the radical polymerization becomes a halogen. The halogen can be converted into another functional group according to a method described below without restricting the method thereto.

(1) An ethylenically unsaturated site is generated by a HX (X=halogen) abstraction reaction (for example, conversion from —$CH_2$—$CH_2$—Br to —CH=$CH_2$).

(2) In a case where the halogen is converted into a (meth)acryloyl residue, in particular, the halogen is allowed to react with an alkali metal salt or ammonium salt of (meth)acrylic acid.

(3) By reacting the halogen with aldehyde or ketone via a Grignard reaction with Mg or the like, the halogen is converted into a hydroxyl group or carboxylic group.

(4) Via a hydroxyl group converted by the above-mentioned method, other functional group such as an amino group, a sulfonate group, a carboxylate group, an alkoxysilane group, an isocyanate group, a thioisocyanate group, an ammonium salt group, or a photoreactive group can be further imparted.

<A Crosslinked Body Comprising a Polyrotaxane According to the Present Invention and a Material Comprising the Crosslinked Body>

The present invention provides A) a material comprising a crosslinked body of a)-1) a polyrotaxane having the cyclic molecule having a radical polymerization initiation site and b) a polymer; B) a material comprising a crosslinked body of a)-2) a polyrotaxane having the cyclic molecule having a graft chain and b) a polymer; or C) a material comprising a mixture of a crosslinked bodies A) and B), or a material consisting essentially of the crosslinked body (bodies), or a material consisting essentially of the mixture thereof.

The term "polymer" used herein means c) a "polyrotaxane", d) the above-described "polyrotaxane having a cyclic molecule having a radical polymerization initiation site", or e) a polymer comprising the above-described "polyrotaxane having a cyclic molecule having a graft chain and a polymer". The "polymer" of course may include f) a polymer other than the items c) to e).

In short, a crosslinked body according to the present invention means 1) a crosslinked body between the "polyrotaxane having a cyclic molecule having a radical polymerization initiation site" and at least one polymer selected from the items c) to f); or 2) a crosslinked body between the "polyrotaxane having a cyclic molecule having a graft chain" and at least one polymer selected from the items c) to f).

In one embodiment, the present invention can provide a material consisting essentially of the item a) (the item a) includes the a)-1) or a-2)) and the item b), depending on a linear molecule used, a cyclic molecule used, a radical polymerization initiation site used, a graft chain used, a polymer used, and the like. Further, in another embodiment, the present invention can provide a solvent-free material comprising the items a) and b). More, in another embodiment, the materials each may further have viscoelastic property.

A material consisting essentially of the crosslinked body or a material comprising the crosslinked body can provide characteristics, in which a "polyrotaxane" inherently have, for example, viscoelasticity. Further, the material can provide a material having characteristics derived from the "graft chain" and/or "a polymer to be crosslinked". The selection of the "graft chain" and/or "a polymer to be crosslinked" can provide, in the absence of any solvent, a material having viscoelasticity. The crosslinked polyrotaxane described in Japanese Patent No. 3475252 could provide a crosslinked polyrotaxane having viscoelasticity for the first time in the presence of a solvent, while a material according to the present invention can provide a material having viscoelasticity in the absence of any solvent.

The materials according to the present invention can be applied to, but are not limited to, an adhesive, an additive of a curable composition, a paint, a coating agent, a sealing material, an ink additive/binder, an electric insulating material, an electric/electronic component material, a piezoelectric material, an optical material, a vibration control/vibration suppression/seismic absorption material, a friction control agent, a cosmetic material, a rubber additive, a rheology control agent, a thickener, a dispersant, a fiber (additive), a macrocrosslinking agent, a polymer polymerization initiator, a medical biological material and the like.

<A Method for Producing a Polyrotaxane Having a Cyclic Molecule Having a Radical Polymerization Initiation Site>

The present invention provides a method for producing the "polyrotaxane having a cyclic molecule having a radical polymerization initiation site".

The "polyrotaxane having a cyclic molecule having a radical polymerization initiation site" according to the present invention can be obtained according to, for example, a method described below:

The method comprises the steps of:

A) preparing a polyrotaxane including a pseudopolyrotaxane, which has a linear molecule and a cyclic molecule(s) in which the linear molecule is included in a cavity (cavities) of the cyclic molecule(s) in a skewered manner, and capping groups, each of which locates at each end of the pseudopolyrotaxane in order to prevent the dissociation of the cyclic molecule(s); and B) introducing a radical polymerization initiation site in the cyclic molecule;

thereby to produce the polyrotaxane having a cyclic molecule having a radical polymerization initiation site.

Each of the terms "polyrotaxane" and "radical polymerization initiation site" has the same meanings as mentioned above.

The step A) is a step of preparing a polyrotaxane. The polyrotaxane can be obtained by referring to documents published before filing the present application (for example, WO2005-080469 and WO2005-108464 (whole contents thereof are incorporated herein by reference)).

The step B) is a step of introducing a radical polymerization initiation site in the cyclic molecule.

For example, in a case where a group derived from 2-bromoisobutylyl bromide (2-bromoisobutylyl group) is used as the radical polymerization initiation site, reacting the polyrotaxane obtained in the step A) with 2-bromoisobutylyl bromide by using dimethyl acetamide as a solvent, and in the presence of triethylamine as a base can obtain a polyrotaxane having a cyclic group having a 2-bromoisobutylyl group. Although a temperature and a pressure depend on a solvent used, a kind of polyrotaxane used and a radical polymerization initiation site introduced, it is preferable that a temperature be from 0 to 120° C.; normal pressure; and a solvent may be one such as dimethylacetamide, dimethylformamide, tetrahydrofuran, ethyl acetate, acetonitrile, cyclohexanone, methyl ethyl ketone, or acetone. Depending on the kinds of the reaction(s), catalysts such as bases or acids may be used. The step B) will be described in detail in Examples 1 and 2.

Various steps may be disposed before the step A), after the step A) and before the step B), or after the step B). For example, after the step A) and before the step B) or almost simultaneously with the step B), the method may further comprise a step of C) introducing a functional group other than the radical polymerization initiation site in the cyclic molecule.

The "functional group other than the radical polymerization initiation site" in the step C) can be appropriately selected depending on the characteristics of resulting polyrotaxane. Examples of the group may include, but are not limited to, for example, a nonionic group described in WO2005-080469 (whole contents thereof are incorporated herein by reference), an ionic group described in WO2005-108464 (whole contents thereof are incorporated herein by reference), a photoreactive group described in WO2006-088200 (whole contents thereof are incorporated herein by reference) and the like.

<A Method for Producing a Polyrotaxane Having a Cyclic Molecule Having a Graft Chain>

The present invention provides a method for producing the "polyrotaxane having a cyclic molecule having a graft chain".

The "polyrotaxane having a cyclic molecule having a graft chain" according to the present invention can be obtained according to, for example, a method described below:

The method comprises the steps of:

A) preparing a polyrotaxane comprising a pseudopolyrotaxane, which has a linear molecule and a cyclic molecule(s) in which the linear molecule is included in a cavity (cavities) of the cyclic molecule(s) in a skewered manner, and capping groups, each of which locates at each end of the pseudopolyrotaxane in order to prevent the dissociation of the cyclic molecule(s);

B) introducing a radical polymerization initiation site in the cyclic molecule; and D) radical graft polymerizing a monomer and/or a macromonomer in the presence of a catalyst to form a graft chain such that the cyclic molecule includes a graft chain obtained by the polymerization;

thereby to obtain the polyrotaxane having a cyclic molecule having a graft chain.

Each of the terms "polyrotaxane", "radical polymerization initiation site" and "graft chain" has the same meanings as mentioned above.

The steps A) and B) are the same as described above. Also, the method, of course, may comprise the step C).

The step D) is a step of forming a graft chain.

A catalyst depends on a monomer and/or a macromonomer used, a radical polymerization initiation site used, and a kind of polyrotaxane used, in particular, a radical polymerization initiation site. For example, the catalyst may be, but is not limited to, a metal complex having at least one central metal selected from the group consisting of copper, nickel, ruthenium and iron.

Examples of the metal complex may include, but are not limited to, specifically, a complex of CuBr and 2,2'-dipyridyl, a complex of CuCl and 2,2'-dipyridyl, a complex of CuBr and pentamethyldiethylene triazine, a complex of CuBr and hexamethyl(2-aminoethyl)amine, a complex of CuBr and hexamethyltriethylene tetramine, a complex of $FeCl_2$ and triphenylphosphine, and a complex of ruthenium chloride and triphenylphosphine.

In the step D), a monomer and/or a macromonomer can be appropriately selected in accordance with characteristics imparted to the resulting polyrotaxane. For example, the monomer and/or the macromonomer may be, but is/are not limited to, a radically polymerizable unsaturated monomer can be cited without restricting thereto. The radically polymerizable unsaturated monomer may be an ethylenically unsaturated monomer.

As the ethylenically unsaturated monomer, a monomer having at least one functional group selected from the group consisting of an acrylic group, a methacrylic group, a vinyl group and a styryl group is preferred. More specific examples thereof may include alkyl (meth)acrylates such as methyl (meth)acrylate (The term "(meth)acrylate" used herein represents both of methacrylate and acrylate. Hereinafter, other compounds each having the term "(meth)" have the same meaning as mentioned above), ethyl (meth)acrylate, n-propyl (meth) acrylate, n-butyl (meth) acrylate, t-butyl(meth)acrylate or stearyl (meth)acrylate; hydroxy (meth)acrylates such as 2-hydroxyethyl (meth)acrylate, 2-hydroxypropyl (meth) acrylate and the like; cyano compounds such as cyanoethyl (meth)acrylate and the like; (meth)acrylamides such as (meth)acrylamide, N,N-dimethyl (meth)acrylamide, N-isopropyl (meth)acrylamide and the like; nitrogen-containing (meth)acrylates such as N,N-dimethylaminoethyl (meth) acrylate and the like; fluoroalkyl (meth)acrylates such as trifluoroethyl (meth)acrylate, pentafluorobutyl (meth)acrylate and the like; siloxanyl compounds such as tris(trimethylsiloxanyl)silylpropyl (meth)acrylate and the like; alkylene glycol or polyol (meth)acrylates such as ethylene glycol (meth)acrylate, triethylene glycol (meth) acrylate, polyethylene glycol (meth) acrylate, propylene glycol (meth)acrylate, polypropylene glycol (meth)acrylate and the like; aromatic vinyl compounds such as styrene, p-methylstyrene, m-methoxystyrene, p-hydroxystyrene and the like; vinyl salts such as sodium 4-vinyl benzoate, sodium p-styrene sulfonate and the like; amphoteric ion (meth)acrylates such as 2-methoxyacryloyloxyethyl phosphorylcholine, [2-(methacryloyloxy)ethyl] dimethyl(3-sulfopropyl) ammonium hydroxide and the like; unsaturated monocarboxylic acids such as cinnamic acid or crotonic acid and esters thereof; oxiranes such as glycidyl (meth)acrylate and the like; oxetanes such as 2-oxetane methyl (meth)acrylate and the like; unsaturated polycarboxylic acids (anhydride) such as (anhydrous) maleic acid, (anhydrous) fumaric acid and the like; and maleinimide (meth) acrylates.

The macromonomer may be, but is not limited to, following macromonomers each having an ethylenically unsaturated bond at an end thereof. Examples thereof may include, but are not limited to, polyether polymers such as polyethylene oxide, polypropylene oxide, polytetramethylene oxide and the like; polyester polymers such as polyethylene terephthalate, polycaprolactone and the like; polymers having a hydrocarbon skeleton such as polyethylene, polypropylene, polystyrene, polyvinyl methyl ether, poly(meth)acrylate and the like; polyamide polymers such as polyhexamethylene adipamide and the like; polyimide acid polymers; polyimide polymers; polyimineamine polymers; polyurethane polymers; polyurea polymers; polydimethylsiloxane polymers; polycarbonate polymers; and copolymers thereof.

While one end of the "graft chain" of the resulting "polyrotaxane having a cyclic molecule having a graft chain" bonds to the cyclic molecule, another end thereof may have various modes as described above. In a case where another end of the graft chain is made of other functional group, a binding body with other compound, or a crosslinked body with other polymer, the method may further comprise a step of introducing them.

<Method for Producing a Material Comprising a Crosslinked Body>

The present invention, as described above, provides A) a material comprising a crosslinked body of a "polyrotaxane having a cyclic molecule having a radical polymerization initiation site" and a polymer; B) a material comprising a crosslinked body of a "polyrotaxane having a cyclic molecule having a graft chain" and a polymer; and C) a material comprising a mixture of crosslinked bodies A) and B).

These materials can be produced according to, for example, one of following methods.

The method comprises the steps of:
X) preparing A') "a polyrotaxane having a cyclic molecule having a radical polymerization initiation site" and/or B') "a polyrotaxane having a cyclic molecule having a graft chain";
Y) preparing b) a polymer; and
Z) bonding a polyrotaxane of A') or B') and b) a polymer through a covalent bond;

thereby to obtain a crosslinked body, a material consisting essentially of the crosslinked body, or a material comprising the crosslinked body.

The step X) can be performed according to a method for producing the "polyrotaxane having a cyclic molecule having a radical polymerization initiation site" and/or a method for producing the "polyrotaxane having a cyclic molecule having a graft chain".

The step Y) can be performed depending on a desired b) polymer.

Here, the "b) polymer" means, as described above, c) "polyrotaxane", d) the "polyrotaxane having a cyclic molecule having a radical polymerization initiation site" or e) a polymer comprising the "polyrotaxane having a cyclic molecule having a graft chain and a polymer". The "polymer", of course, comprises f) a polymer other than the items c) to e).

The step Z) is a step of bonding a polyrotaxane of A') or B') and b) a polymer via a covalent bond. In the step, depending on a polyrotaxane used and a polymer used, various methods can be used.

For example, in the step Z), a) a polyrotaxane and b) a polymer can be bound to each other by using i) a crosslinking agent. The method can be used when, for example, "a polyrotaxane having a cyclic molecule having a graft chain" has a hydroxyl group in the graft chain.

Examples of the crosslinking agent may include, but are not limited to, cyanuric chloride, trimesoyl chloride, terephthaloyl chloride, epichlorohydrin, dibromobenzene, gultaraldehyde, aliphatic polyfunctional isocyanate, aromatic polyfunctional isocyanate, tollylene diisocyanate, hexamethylene diisocyanate, divinyl sulfone, 1,1'-carbonyldiimidazole, acid anhydrides such as ethylenediaminetetraacetate dianhydride and mesobutane-1,2,3,4-tetracarboxylate dianhydride, polyfunctional acid hydrazines, polyfunctional carboimides, alkoxysilanes, and derivatives thereof.

For example, in the step Z), a) a polyrotaxane and b) a polymer can be bound to each other by using ii) a catalyst. The method can be used in a case where, for example, a graft chain of "a polyrotaxane having a cyclic molecule having a graft chain" has a reactive group such as an epoxy group, a lactone group and an acid anhydride.

The catalyst used depends on a kind of a reactive group in the graft chain and a kind of b) a polymer. Examples thereof may include, but are not limited to, bases such as triethylamine, diisopropylethylamine, pyridine and the like; and acids such as paratoluene sulfonic acid, $BF_3$, $ZnCl_2$, $AlCl_3$ and the like.

For example, in the step Z), a) a polyrotaxane and b) a polymer can be bound to each other by iii) photo-irradiation. The method can be used in a case where, for example, a graft chain of the "polyrotaxane having a cyclic molecule having the graft chain" has a photoreactive group.

The "photoreactive group" is not particularly restricted as long as it is a group that can react and bond each other by irradiation of UV-rays and/or visible rays. For example, the photoreactive group may be, but is not limited to, an unsaturated bond group or a photoreactive group. More specific examples of the "photoreactive group" may include an unsaturated bond group such as an acryloyl group, a 2-acryloyloxyethyl carbamoyl group, a methacryloyl group, a 2-methacryloyloxyethyl carbamoyl group, a 3-methacryloyloxy-2-hydroxypropyl group, a 2-(2-methacryloyloxyethyloxy) ethylcarbamoyl group, a vinyl ether group, a styryl group or an olefinyl group such as a derivative thereof; and a photosensitive group typical in a cinnamoyl group, a cinnamilidene group, a chalkone residue, coumarin residue, a stilbene residue, a styrylpyridinium residue, a thymine residue, an α-phenylmaleimide residue, an anthracene residue, and a 2-pyrone residue. Preferably, the photoreactive group may be an acryloyl group, a 2-acryloyloxyethyl carbamoyl group, a methacryloyl group, and a 2-methacryloyloxyethyl carbamoyl group and more preferably a 2-acryloyloxyethyl carbamoyl group and a 2-methacryloyloxyethyl carbamoyl group.

Furthermore, in a case where crosslinking reaction is initiated by photo-irradiation, the reaction initiator may be at least one selected from the group consisting of quinones, aromatic ketones, benzoin, benzoin ethers, biimidazole compounds and derivatives thereof, N-phenylglycines, combinations of thioxanthones and alkylaminobenzoic acid, combinations of biimidazole compounds and derivatives thereof and Michler's ketones, acridines, and oxime esters. Specifically, the reaction initiator may be, but is not limited to, quinones such as 2-ethylanthraquinone, octaethylanthraquinone, 1,2-benzanthraquinone, 2,3-benzanthraquinone, 2-phenylanthraquinone, 2,3-diphenylanthraquinone, 1-chloroanthraquinone, 1,4-naphthoquinone, 9,10-phenanthraquinone, 2-methyl-1,4-naphthoquinone, 2,3-dimethylanthraquinone, 3-chloro-2-methylanthraquinone and the like; aromatic ketones such as benzophenone, Michler's ketone[4,4'-bis(dimethylamino)benzophenone], 4,4'-bis(diethylamino)benzophenone and the like; benzoin ethers such as benzoin, benzoinethyl ether, benzoinphenyl ether, methylbenzoin, ethylbenzoin and the like; biimidazole compounds and derivatives thereof such as benzyldimethyl ketal, benzyldiethyl ketal, triarylimidazolyl dimers and the like; N-phenylglycines such as N-phenylglycine, N-methyl-N-phenylglycine, N-ethyl-N-phenylglycine and the like; combinations of thioxanthones and alkylamine benzoic acid such as a combination of ethylthioxanthone and ethyl dimethylaminobenzoate, a combination of 2-chlorothioxanthone and ethyl dimethylaminobenzoate, a combination of isopropylthioxanthone and ethyl dimethylbenzoate, and the like; combinations of biimidazole compounds such as triarylimidazolyl dimers and derivatives thereof and Michler's ketone; acridines such as 9-phenylacridine and the like; and oxime esters such as 1-phenyl-1,2-propanedione-2-o-benzoineoxime, 1-phenyl-1,2-propanedione-2-(o-ethoxycarbonyl)oxime and the like. Preferably, the reaction initiator may be thioxanthones such as diethylthioxanthone, chlorothioxanthone and the like; dialkylaminobenzoate esters such as ethyl dimethylaminobenzoate and the like; benzophenone, 4,4'-bis(dimethylamino)benzophenone, 4,4'-bis(diethylamino)benzophenone; biimidazole compounds such as triarylimidazolyl dimers and derivatives thereof; 9-phenylacridine, N-phenylglycines; and combinations thereof. Furthermore, the biimidazole compounds such as triarylimidazolyl dimers and derivatives thereof may include, but are not limited to, for example, 2-(o-chlorophenyl)-4,5-diphenylimidazolyl dimers,
2,2',5-tris-(o-chlorophenyl)-4-(3,4-dimethoxyphenyl)-4',5'-diphenylimidazolyl dimers,
2,4-bis-(o-chlorophenyl)-5-(3,4-dimethoxyphenyl)-diphenylimidazolyl dimers,
2,4,5-tris-(o-chlorophenyl)-diphenylimidazolyl dimers,
2-(o-chlorophenyl)-bis-4,5-(3,4-dimethoxyphenyl)-imidazolyl dimers,
2,2'-bis-(2-fluorophenyl)-4,4',5,5'-tetrakis-(3-methoxyphenyl)-imidazolyl dimers,
2,2'-bis-(2,3-difluoromethylphenyl)-4,4',5,5'-tetrakis-(3-methoxyphenyl)-imidazolyl dimers,
2,2'-bis-(2,4-difluorophenyl)-4,4',5,5'-tetrakis-(3-methoxyphenyl)-imidazolyl dimers,
2,2'-bis-(2,5-difluorophenyl)-4,4',5,5'-tetrakis-(3-methoxyphenyl)-imidazolyl dimers,
2,2'-bis-(2,6-difluorophenyl)-4,4',5,5'-tetrakis-(3-methoxyphenyl)-imidazolyl dimers,
2,2'-bis-(2,3,4-trifluorophenyl)-4,4',5,5'-tetrakis-(3-methoxyphenyl)-imidazolyl dimers,
2,2'-bis-(2,3,5-trifluorophenyl)-4,4',5,5'-tetrakis-(3-methoxyphenyl)-imidazolyl dimers,
2,2'-bis-(2,3,6-trifluorophenyl)-4,4',5,5'-tetrakis-(3-methoxyphenyl)-imidazolyl dimers,
2,2'-bis-(2,4,5-trifluorophenyl)-4,4',5,5'-tetrakis-(3-methoxyphenyl)-imidazolyl dimers,
2,2'-bis-(2,4,6-trifluorophenyl)-4,4',5,5'-tetrakis-(3-methoxyphenyl)-imidazolyl dimers,
2,2'-bis-(2,3,4,5-tetrafluorophenyl)-4,4',5,5'-tetrakis-(3-methoxyphenyl)-imidazolyl dimers,
2,2'-bis-(2,3,4,6-tetrafluorophenyl)-4,4',5,5'-tetrakis-(3-methoxyphenyl)-imidazolyl dimers,
2,2'-bis-(2,3,4,5,6-pentafluorophenyl)-4,4',5,5'-tetrakis-(3-methoxyphenyl)-imidazolyl dimers, and the like.

EXAMPLES

The present invention will be illustrated more specifically by way of following Examples, but is not limited thereby.

Example 1

<Synthesis of 2-Bromoisobutylylated Polyrotaxane (Macro-Initiator), Degree of Modification 47%>

A compound (hereinafter, abbreviating hydroxypropylated polyrotaxane as "HAPR35") obtained by hydroxypropylating a polyrotaxane formed of a linear molecule: polyethylene glycol (average molecular weight: 35,000), a cyclic molecule: α-cyclodextrin (hereinafter, simply abbreviating "cyclodextrin" as "CD"), and a capping group: an adamantane amine group was prepared in a manner similar to the method described in WO2005-080469 (whole contents thereof are incorporated herein by reference) (α-CD inclusion amount: 25%).

35.50 g of the HAPR was measured and charged in a three-neck flask, followed by pre-drying and substituting with nitrogen. Thereto, 0.6 g of dimethylaminopyridine was added, and 50 ml of similarly nitrogen-substituted dimethyl acetamide (hereinafter, abbreviated as "DMAc") was added and dissolved. In an ice bath, 7.6 ml (1.1 equivalent based on all OH groups in the polyrotaxane) of triethyl amine and 6.2 ml (1.0 equivalent based on all OH groups in the polyrotaxane) of 2-bromoisobutylyl bromide were dropped and allowed to react at a temperature of 0° C. to room temperature for 5 hr. A reaction solution was dropped in hexane, a re-precipitation was recovered and dried under reduced pressure. The resulting 2-bromoisobutylylated HAPR (hereinafter, abbreviated as "EX-HAPR" in some cases) had the degree of modification (=the degree at which OH groups of an α-CD were substituted with 2-bromoisobutylyl group) of 47% determined by $^1$H-NMR. GPC determined that weight average molecular weight, Mw, was 210,000 and molecular weight distribution, Mw/Mn, was 1.5.

Example 2

<Synthesis of 2-Bromoisobutylylated Polyrotaxane (Macro-Initiator), Degree of Modification 24%>

A polyrotaxane EX-HAPR was obtained in a manner similar to Example 1, except that an amount of triethylamine was 1.5 ml (0.22 equivalents based on all OH groups in the polyrotaxane), an amount of 2-bromoisobutylyl bromide was 1.2 ml (0.25 equivalents based on all OH groups in the polyrotaxane).

GPC determined that weight average molecular weight, Mw, was 151,000, and molecular weight distribution, Mw/Mn, was 1.4. It was determined by $^1$H-NMR that the degree of modification was 24%.

Example 3

<Synthesis of Methyl Methacrylate (MMA)-Grafted HAPR>

2.0 g of EX-HAPR (degree of modification: 47%) prepared in Example 1 was charged in a three-neck flask. After nitrogen substitution, 17.7 ml of methyl methacrylate (40 equivalents to the number of moles of 2-bromoisobutylyl group) was added thereto, and dissolved. Thereto, 5 ml of nitrogen-substituted DMAc was added, and stirred. Subsequently, 0.06 g of copper bromide and 0.13 g of 2,2'-dipyridyl as a catalyst were added and stirred at room temperature for 5 hr. After 5 hr, a reaction system was opened. After confirming that a reaction solution changed from brownish-red to green, suction filtration was performed by using silica as a filtration aid. The filtrate was dropped in methanol and a re-precipitation was recovered and dried under reduced pressure. An amount of the resulting product (Methyl methacrylate group-introduced EX-HAPR. Hereinafter, in some cases, abbreviated as "MM-EX-HAPR") was 3.8 g. GPC determined that weight average molecular weight, Mw, was 720,000 and molecular weight distribution, Mw/Mn, was 2.0. It was determined by the result of GPC as well as the results of GPC and $^1$H-NMR determined in Example 1 that average molecular weight of the graft chain was 600.

Although HAPR35 that is a raw material was insoluble in a ketone solvent (for example, acetone, methyl ethyl ketone and cyclohexanone), the resulting MM-EX-HAPR was soluble in acetone, methyl ethyl ketone and cyclohexanone. In the Examples, the term "soluble" means that a polyrotaxane forms a homogeneous phase with a solvent when 0.02 g of the polyrotaxane is charged in 1 ml of a solvent and stirred for 2 hr.

Example 4

<Synthesis of Hydroxyethyl Methacrylate (HEMA)-Grafted HAPR>

1.0 g of EX-HAPR (degree of modification: 24%) prepared in Example 2 was charged in a three-neck flask. After nitrogen substitution, 4.6 g of HEMA (20 equivalents to the number of moles of 2-bromoisobutylyl group) was added thereto, and dissolved. Thereto, 10 ml of nitrogen-substituted DMAc was added, and stirred in an ice bath. Subsequently, 0.03 g of copper bromide and 0.06 g of 2,2'-dipyridyl as a catalyst were added thereto, and stirred at a temperature of 0° C. to room temperature for 5 hr. After 5 hr, a reaction system was opened. After confirming that a reaction solution changed from brownish-red to green, suction filtration was performed by using silica as a filtration aid. The filtrate was dropped in water and a re-precipitation was recovered and dried under reduced pressure. An amount of the resulting product (HEMA-introduced EX-HAPR. Hereinafter, in some cases, abbreviated as "HE-EX-HAPR") was 0.9 g. GPC determined that weight average molecular weight, Mw, was 413,000 and molecular weight distribution, Mw/Mn, was 2.6. It was determined by the result of GPC as well as the results of GPC and $^1$H-NMR determined in Example 2 that average molecular weight of the graft chain was 610.

Example 5

<Synthesis of HAPR Grafted with a Random Copolymer of MMA and HEMA>

1.0 g of EX-HAPR (degree of modification: 24%) prepared in Example 2 was charged in a three-neck flask. After nitrogen substitution, 1.7 ml of methyl methacrylate (10 equivalents to the number of moles of 2-bromoisobutylyl group) and 0.4 ml of HEMA (2 equivalents to the number of moles of 2-bromoisobutylyl group) were added thereto, and dissolved. Thereto, 30 ml of nitrogen-substituted DMAc was added, and stirred in an ice bath. Subsequently, 0.03 g of copper bromide and 0.08 g of 2,2'-dipyridyl as a catalyst were added thereto, and stirred at a temperature from 0° C. to room temperature for 26 hr. A reaction system was opened. After confirming that a color of a reaction solution changed from brownish-red to green, suction filtration was performed by using silica as a filtration aid. The filtrate was dropped in water and a re-precipitation was recovered, and dried under reduced pressure. An amount of the resulting product (methyl methacrylate- and HEMA-introduced EX-HAPR. Hereinafter, in some cases, abbreviated as "HE-EX-HAPR") was 1.4 g. GPC determined that weight average molecular weight, Mw, was 600,000 and molecular weight distribution, Mw/Mn, was 2.2. It was determined by the result of GPC as well as the results of GPC and $^1$H-NMR determined in Example 2 that average molecular weight of the graft chain was 1044.

Although HAPR35 that is a raw material was insoluble in a ketone solvent (for example, acetone, methyl ethyl ketone and cyclohexanone), the resulting HM-EX-HAPR was soluble in acetone, methyl ethyl ketone and cyclohexanone.

Comparative Example 1

3.0 g of HAPR was measured and pre-dried, followed by nitrogen substitution. Thereto, 20 ml of dimethylsulfoxide was added, and dissolved. To the solution, 1.74 g of 4-dimethylaminopyridine and 12.9 g of lauryl alcohol poly(ethylene oxide) glycidyl ether (trade name: DENACOL EX-171, manufactured by Nagase ChemteX Corporation, average molecular weight Mw: about 900) in which 20 ml of dimethylsulfoxide was dissolved were added and allowed to react at 60° C. for 6 hr. The reaction solution was dropped in acetone and a re-precipitation was recovered and dried under reduced pressure. The resulting product was analyzed by measuring with $^1$H-NMR and GPC and found that the reaction was not almost forwarded. Namely, a $^1$H-NMR spectrum did not show any changes. Molecular weight, Mw, was 140,000 and showed almost no difference from that of the HAPR35 of a raw material.

From a difference between an weight average molecular weight Mw of a raw material and an weight average molecular weight Mw of the resulting substance (grafted substance), it is found that while, in a system (Comparative Example 1) where a polyrotaxane having a cyclic molecule: α-CD having a radical polymerization initiation site is not used, a graft chain can not be readily bound to a cyclic molecule, in a system (Examples 3 to 5) where a polyrotaxane having a cyclic molecule: α-CD having a radical polymerization initiation site is used, a graft chain can be readily bound thereto.

Example 6

<Synthesis of Polyethylene Glycol Monoacrylate (Mn=375, Manufactured by Aldrich Chemical Co.)-Grafted HAPR>

In the beginning, 0.5 g of EX-HAPR (degree of modification: 24%) prepared in Example 2 was charged in a three-neck flask. After nitrogen substitution, 4.5 g of polyethylene glycol monoacrylate (10 equivalents to the number of moles of 2-bromoisobutylyl group) was added thereto, and dissolved. Thereto, 50 ml of nitrogen-substituted DMAc was added, and stirred. Subsequently, 0.2 g of copper bromide and 0.4 g of 2,2'-dipyridyl as a catalyst were added thereto, and stirred at room temperature for 26 hr. The resulting solution was sampled, and the sample was subjected to GPC measurement, showing that a weight average molecular weight, Mw, was 383,000 and molecular weight distribution, Mw/Mn, was 1.7. It was determined by the result of GPC as well as the results of GPC and $^1$H-NMR determined in Example 2 that average molecular weight of the graft chain was 540. From Examples 3 to 6, it was found that depending on a monomer used, a molecular weight of a graft chain could be broadly varied.

Example 7

<Chemically-Crosslinked Body of HE-EX-HAPR>

50 mg of HE-EX-HAPR obtained in Example 4 was dissolved in 200 μl (20% by weight) of dehydrated dimethylsulfoxide, followed by adding 10 μl (4% by weight) of hexamethylene diisocyanate, further followed by stirring. The solution was stood still at 60° C. for 16 hr, thereby to obtain a viscoelastic crosslinked body.

Example 8

<Chemically-Crosslinked Body of HM-EX-HAPR>

50 mg of HM-EX-HAPR obtained in Example 5 was dissolved in 200 μl (20% by weight) of dehydrated dimethylsulfoxide, followed by adding 18 μl (7% by weight) of hexamethylene diisocyanate, further followed by stirring. The solution was stood still at 60° C. for 16 hr, thereby to obtain a viscoelastic crosslinked body.

Example 9

<Film Formation of HM-EX-HAPR>

0.2 g of HM-EX-HAPR obtained in Example 5 was dissolved in 300 μl (30% by weight) of dehydrated tetrahydrofuran, followed by adding 139 μl (39% by weight) of hexamethylene diisocyanate, further followed by stirring.

The solution was applied on a stainless plate and stood still in a closed system at 50° C. for 16 hr to crosslink. Thereafter, a solvent was removed by drying under reduced pressure, thereby to obtain a film. The resulting film was adjusted to a length of 30 mm and a width of 4 mm, and subjected to a viscoelasticity measurement, showing that Young's modulus was 4.40 MPa. It shows that this material has viscoelasticity without a solvent.

Comparative Example 2

After a crosslinked body of HAPR35 was prepared according to WO2005-080469, the solution was applied on a stainless plate, and stood still in a closed system at 50° C. for 16 hr to crosslink. Thereafter, a solvent was removed by drying under reduced pressure, to obtain a brittle film. Accordingly, viscoelasticity of the brittle film could not be measured.

What is claimed is:

1. A polyrotaxane comprising a pseudopolyrotaxane, which has a linear molecule and a cyclic molecule(s) in which the linear molecule is included in a cavity (cavities) of the cyclic molecule(s) in a skewered manner, and capping groups, each of which locates at each end of the pseudopolyrotaxane in order to prevent the dissociation of the cyclic molecule(s), wherein the cyclic molecule comprises a radical polymerization initiation site, wherein said radical polymerization initiation site is an atom transfer radical polymerization initiation site;

wherein said cyclic molecule has hydroxy groups, and a part or all of the hydroxy groups is/are substituted with an organic halogen compound residue(s), to form said radical polymerization initiation site; and wherein said organic halogen compound residue is a residue derived from an organic halogen compound selected from the group consisting of 2-bromoisobutylyl bromide, 2-bromobutyric acid, 2-bromopropionic acid, 2-chloropropionic acid, 2-bromoisobutyric acid, epichlorohydrin, epibromohydrin, and 2-chloroethyl isocyanate.

2. The polyrotaxane according to claim 1, wherein said polyrotaxane has a graft chain, which is bound to the polyrotaxane via said radical polymerization initiation site.

3. The polyrotaxane according to claim 2, wherein said graft chain is formed by a radical polymerization of a monomer, is a macromonomer, or is formed by a radical polymerization of a macromonomer.

4. The polyrotaxane according to claim 2, wherein said graft chain has a weight average molecular weight of 100 to 20,000.

5. The polyrotaxane according to claim 2, wherein said graft chain is either a homopolymer made of one monomer or a copolymer made of two or more monomers, said copolymer being one selected from the group consisting of a random copolymer, a block copolymer, an alternate copolymer, and a graft copolymer.

6. The polyrotaxane according to claim 3, wherein said monomer or macromonomer is an ethylenically unsaturated monomer.

7. The polyrotaxane according to claim 6, wherein said ethylenically unsaturated monomer is a monomer having at least one functional group selected from the group consisting of an acrylic group, a methacrylic group, a vinyl group, and a styryl group.

8. The polyrotaxane according to claim 3, wherein, said cyclic molecule has hydroxyl groups, a part or all of the hydroxyl groups are substituted with an organic halogen compound residue(s) to form said atom transfer radical polymerization initiation site, said monomer or macromonomer is an ethylenically unsaturated monomer, and said graft chain is formed by an atom transfer radical polymerization of said ethylenically unsaturated monomer.

9. A material comprising:
a) the polyrotaxane according to claim 1; and
b) a polymer;
wherein said a) polyrotaxane and said b) polymer are bound to each other through a covalent bond.

10. The material according to claim 9, wherein a) said polyrotaxane has a graft chain, which is bound to the polyrotaxane via said radical polymerization initiation site.

11. The material according to claim 9, wherein b) said polymer is c) a polyrotaxane including a pseudopolyrotaxane, which has a linear molecule and a cyclic molecule(s) in which the linear molecule is included in a cavity (cavities) of the cyclic molecule(s) in a skewered manner, and capping groups, each of which locates at each end of the pseudopolyrotaxane in order to prevent the dissociation of the cyclic molecule(s).

12. The material according to claim 9, wherein b) said polymer is d) a polyrotaxane comprising a pseudopolyrotaxane, which has a linear molecule and a cyclic molecule(s) in which the linear molecule is included in a cavity (cavities) of the cyclic molecule(s) in a skewered manner, and capping groups, each of which locates at each end of the pseudopolyrotaxane in order to prevent the dissociation of the cyclic molecule(s),
wherein the cyclic molecule comprises a radical polymerization initiation site.

13. The material according to claim 9, wherein b) said polymer is e) a polyrotaxane comprising a pseudopolyrotaxane, which has a linear molecule and a cyclic molecule(s) in which the linear molecule is included in a cavity (cavities) of the cyclic molecule(s) in a skewered manner, and capping groups, each of which locates at each end of the pseudopolyrotaxane in order to prevent the dissociation of the cyclic molecule(s),
wherein the cyclic molecule comprises a radical polymerization initiation site; and
said polyrotaxane has a graft chain, which is bound to the polyrotaxane via said radical polymerization initiation site.

14. A material comprising:
d) a polyrotaxane comprising a pseudopolyrotaxane, which has a linear molecule and a cyclic molecule(s) in which the linear molecule is included in a cavity (cavities) of the cyclic molecule(s) in a skewered manner, and capping groups, each of which locates at each end of the pseudopolyrotaxane in order to prevent the dissociation of the cyclic molecule(s),
wherein the cyclic molecule comprises a radical polymerization initiation site, wherein said radical polymerization initiation site is an atom transfer radical polymerization initiation site; and
e) a polyrotaxane comprising a pseudopolyrotaxane, which has a linear molecule and a cyclic molecule(s) in which the linear molecule is included in a cavity (cavities) of the cyclic molecule(s) in a skewered manner, and capping groups, each of which locates at each end of the pseudopolyrotaxane in order to prevent the dissociation of the cyclic molecule(s),
wherein the cyclic molecule comprises a radical polymerization initiation site, wherein said radical polymerization initiation site is an atom transfer radical polymerization initiation site; and
said polyrotaxane has a graft chain, which is bound to the polyrotaxane via said radical polymerization initiation site; and/or
f) the material according to claim 9.

15. A material comprising:
e) a polyrotaxane comprising a pseudopolyrotaxane, which has a linear molecule and a cyclic molecule(s) in which the linear molecule is included in a cavity (cavities) of the cyclic molecule(s) in a skewered manner, and capping groups, each of which locates at each end of the pseudopolyrotaxane in order to prevent the dissociation of the cyclic molecule(s),
wherein the cyclic molecule comprises a radical polymerization initiation site, wherein said radical polymerization initiation site is an atom transfer radical polymerization initiation site;
wherein said cyclic molecule has hydroxy groups, and a part or all of the hydroxy groups is/are substituted with an organic halogen compound residue(s), to form said radical polymerization initiation site;
wherein said organic halogen compound residue is a residue derived from an organic halogen compound selected from the group consisting of 2-bromoisobutylyl bromide, 2-bromobutyric acid, 2-bromopropionic acid, 2-chloropropionic acid, 2-bromoisobutyric acid, epichlorohydrin, epibromohydrin, and 2-chloroethyl isocyanate; and
said polyrotaxane has a graft chain, which is bound to the polyrotaxane via said radical polymerization initiation site; and
f) the material according to claim 9.

16. A method for producing a polyrotaxane having a cyclic molecule comprising a radical polymerization initiation site, wherein said radical polymerization initiation site is an atom transfer radical polymerization initiation site: comprising the steps of:
A) preparing a polyrotaxane comprising a pseudopolyrotaxane, which has a linear molecule and a cyclic molecule(s) in which the linear molecule is included in a cavity (cavities) of the cyclic molecule(s) in a skewered manner, and capping groups, each of which locates at each end of the pseudopolyrotaxane in order to prevent the dissociation of the cyclic molecule(s); and
B) introducing said radical polymerization initiation site into said cyclic molecule, wherein said cyclic molecule has hydroxy groups, and a part or all of the hydroxy groups is/are substituted with an organic halogen compound residue(s), to form said radical polymerization initiation site; and wherein said organic halogen compound residue is a residue derived from an organic halogen compound selected from the group consisting of 2-bromoisobutylyl bromide, 2-bromobutyric acid, 2-bromopropionic acid, 2-chloropropionic acid, 2-bromoisobutyric acid, epichlorohydrin, epibromohydrin, and 2-chloroethyl isocyanate.

17. The method according to claim 16 further comprising C) a step of introducing a functional group other than said radical polymerization initiation site into said cyclic molecule, after the step A), before the step B), or substantially during the step B).

18. A method for producing a polyrotaxane having a cyclic molecule comprising a graft chain: comprising the steps of:
A) preparing a polyrotaxane comprising a pseudopolyrotaxane, which has a linear molecule and a cyclic molecule(s) in which the linear molecule is included in a cavity (cavities) of the cyclic molecule(s) in a skewered manner, and capping groups, each of which locates at each end of the pseudopolyrotaxane in order to prevent the dissociation of the cyclic molecule(s);
B) introducing a radical polymerization initiation site into said cyclic molecule, wherein said radical polymerization initiation site is an atom transfer radical polymerization initiation site wherein said cyclic molecule has hydroxy groups, and a part or all of the hydroxy groups is/are substituted with an organic halogen compound residue(s), to form said radical polymerization initiation site; and wherein said organic halogen compound residue is a residue derived from an organic halogen compound selected from the group consisting of 2-bromoisobutylyl bromide, 2-bromobutyric acid, 2-bromopropionic acid, 2-chloropropionic acid, 2-bromoisobutyric acid, epichlorohydrin, epibromohydrin, and 2-chloroethyl isocyanate; and D) radical graft polymerizing a monomer and/or a macromonomer in the presence of a catalyst, to form said graft chain such that said cyclic molecule comprises said graft chain obtained by the polymerization.

19. The method according to claim 18, wherein said catalyst is a metal complex having at least one central metal selected from the group consisting of copper, nickel, ruthenium, and iron.

20. The method according to claim 18, wherein said cyclic molecule has hydroxyl groups, a part or all of the hydroxyl groups are substituted with an organic halogen compound residue(s) to form said atom transfer radical polymerization initiation site, said monomer and/or macromonomer is an ethylenically unsaturated monomer, said catalyst is a metal complex having at least one central metal selected from the group consisting of copper, nickel, ruthenium, and iron, and said graft chain is formed by an atom transfer radical polymerization of said ethylenically unsaturated monomer.

21. A method for producing a material comprising a) the polyrotaxane according to claim 1; and b) a polymer, wherein a) the polyrotaxane and b) the polymer are bound to each other through a covalent bond, comprising the steps of:
X) preparing a) the polyrotaxane according to claim 1;
Y) preparing b) the polymer; and
Z) bonding a) the polyrotaxane and b) the polymer through a covalent bond.

22. The method according to claim 21, wherein, in the step Z), a) the polyrotaxane and b) the polymer are bound to each other by use of i) a crosslinking agent.

23. The method according to claim 21, wherein, in the step Z), a) the polyrotaxane and b) the polymer are bound to each other by use of ii) a catalyst.

24. The method according to claim 21, wherein, in the step Z), a) the polyrotaxane and b) the polymer are bound to each other by photo-irradiation.

* * * * *